United States Patent [19]

Nakajima et al.

[11] Patent Number: 4,931,823

[45] Date of Patent: * Jun. 5, 1990

[54] MULTIMODE CAMERAS

[75] Inventors: Yukio Nakajima, Kanagawa; Minoru Hara, Hachioji, both of Japan

[73] Assignee: Olympus Optical Co., Ltd., Japan

[*] Notice: The portion of the term of this patent subsequent to Mar. 21, 2006 has been disclaimed.

[21] Appl. No.: 322,662

[22] Filed: Mar. 13, 1989

Related U.S. Application Data

[63] Continuation of Ser. No. 27,868, Mar. 19, 1987, Pat. No. 4,814,812.

Foreign Application Priority Data

Mar. 31, 1986 [JP] Japan .................. 61-073891

[51] Int. Cl.$^5$ ................................. G03B 7/00
[52] U.S. Cl. ..................... 354/412; 354/289.1
[58] Field of Search ........... 354/286, 289.1, 289.12, 354/412, 441–443, 474, 475

[56] References Cited

U.S. PATENT DOCUMENTS 4,286,849  9/1981  Uchidoi et al. .......... 354/289.12
4,455,068  6/1984  Izuhara ................... 354/412
4,814,812  3/1989  Nakajima et al. ......... 354/412

FOREIGN PATENT DOCUMENTS 57-109165  2/1982  Japan .

Primary Examiner—L. T. Hix
Assistant Examiner—David M. Gray
Attorney, Agent, or Firm—Louis Weinstein

[57] ABSTRACT

A multimode camera comprises means for independently setting an aperture and a shutter speed to their optional values, means for selectively setting an AV-TV characteristic line in accordance with the aperture and shutter speed which have been set by the independently setting means, means for storing the AV-TV characteristic line which have been selected by the selectively setting means in accordance with a lens identification number of a lens barrel mounted on the camera, and means for unequivocally reading out the AV-TV characteristic line which have been stored in the storing means in accordance with the lens identification number of the lens barrel when a power source is turned on and/or the lens barrel is mounted on a camera body.

7 Claims, 4 Drawing Sheets

MULTIMODE CAMERAS

This is a continuation of application Ser. No. 027,868, filed March 19, 1987, now U.S. Pat. No. 4,814,812.

BACKGROUND OF THE INVENTION

The present invention relates to multimode cameras, and more particularly, to multimode cameras which take a picture by optionally selecting one of a plurality of photographing modes such as shutter speed-priority automatic exposure, aperture-priority automatic exposure, programmed automatic exposure and the like.

Recently, most of the deluxe single-lens reflex cameras have the multimode functions which are capable of optionally selecting one of the automatic exposure modes of shutter speed priority, aperture-priority and programmed photography and a manual mode. Accordingly, a photographer can take an intended picture by selecting a desirous one from these photographing modes each time of photographing.

However, since the mode selection for each photographing is actually troublesome, most photographers take a picture with the programmed automatic exposure mode selected which is regarded as most advantageous.

Further, although such a camera system has a capability such that a characteristic line of AV-TV for determining an aperture value and a shutter speed with respect to an exposure value EV can be optionally defined is well known, it requires to redefine a most suitable characteristic line of AV-TV to a kind of lens whenever a lens barrel is changed, so that such camera is troublesome to handle in practice.

SUMMARY OF THE INVENTION

It is an object of the present invention, in view of the foregoing, to provide a multimode camera which is capable of simply selecting a photographing mode and a characteristic line of AV-TV from the photographing modes and characteristic lines of AV-TV which have been optionally established on the camera side, in accordance with a photographer's intention, whenever a lens barrel is mounted on the camera.

According to the present invention, a multimode camera comprises means for independently setting a diaphragm aperture and a shutter speed to their optional values, means for selectively setting an AV-TV characteristic line in accordance with the aperture and the shutter speed which have been set by the independently setting means, means for storing the AV-TV characteristic line selectively set by the selectively setting means in correspondence with a lens identification number of a lens barrel mounted on the camera, and means for unequivocally reading out the AV-TV characteristic line stored in the storing means in accordance with the lens identification number of the lens barrel when a power source is turned and/or the lens barrel is mounted on the camera.

In a multimode camera according to the present invention, when a lens barrel is mounted on the camera and/or a power source is turned on, a photographing mode and an AV-TV characteristic line which have been preset by a photographer are selectively read from a storing means in accordance with an identification number of the lens barrel.

According to the present invention, since a photographer can select a photographing mode, aperture, shutter speed and the like which are most desirable in accordance with photographing conditions when a lens barrel is mounted and/or a power source is turned on, it is possible to simply and freely take an intended picture.

DESCRIPTION OF THE PREFERRED EMBODIMENTS

Figure 1:
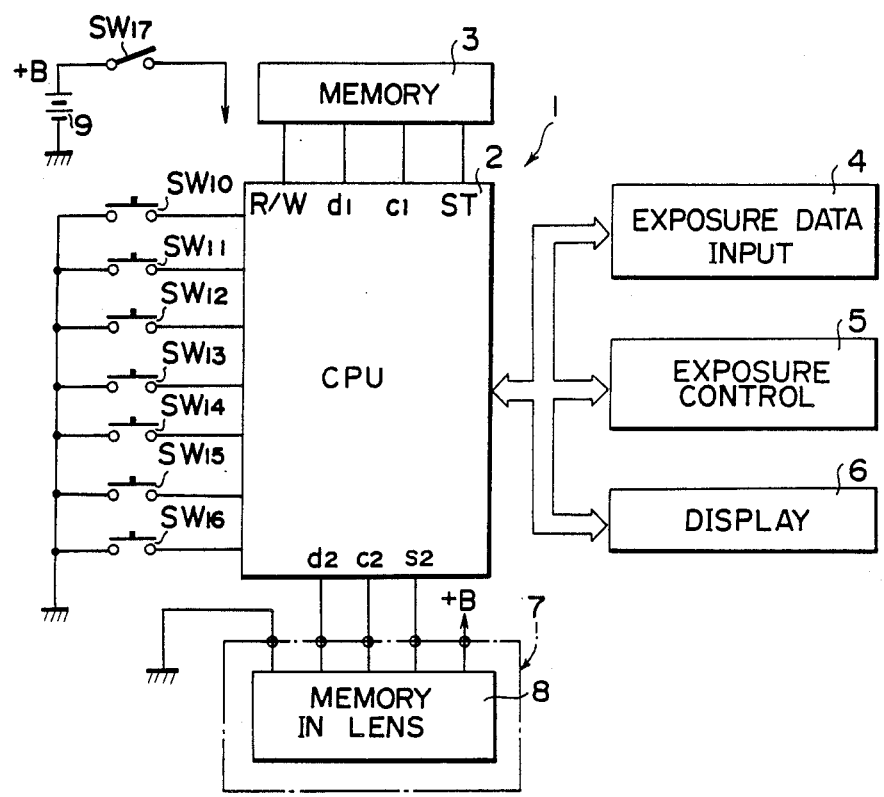
FIG. 1 is a block diagram of an electric circuit for an embodiment of a multimode camera according to the present invention.

Referring to FIG. 1, which shows a first embodiment of the present invention, a release switch $SW_{10}$, mode selecting switch $SW_{11}$, data input switch $SW_{12}$, shutter speed-up switch $SW_{13}$, shutter speed-down switch $SW_{14}$, aperture-up switch $SW_{15}$ and aperture-down switch $SW_{16}$ are connected to a CPU (central processor unit) 2 in a camera body 1. Terminals of R/W, $d_1$, $c_1$, and ST of the CPU 2 are connected to a memory circuit 3 comprising non-volatile memory elements. Signals are transferred through data bus lines among CPU 2, exposure data input circuit 4, exposure control circuit 5 and display circuit 6. Terminals $d_2$, $c_2$ and $s_2$ of CPU 2 are connected to a memory in lens circuit 8 in a lens within a lens barrel 7 through signal terminals on a lens barrel mount, when the lens barrel 7 is mounted on the camera body 1. A voltage $+B$ of a power cell 9 housed within the camera body 1 is applied to electric circuits of the camera body 1 and the lens barrel 7 when a power switch $SW_{17}$ is turned on.

Figure 2:
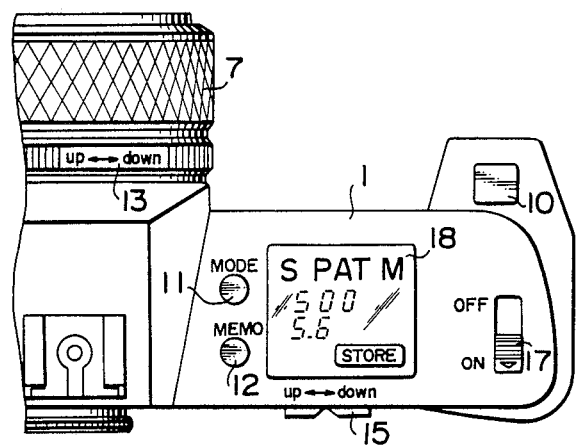
FIG. 2 is an exterior top plan view of essential parts of the camera shown in FIG. 1.

In FIG. 2, a release button 10, mode button 11 and memo button 12 respectively correspond to the release switch $SW_{10}$, mode selecting switch $SW_{11}$ and data input switch $SW_{12}$ so as to turn a corresponding switch on when each of the buttons is depressed. A shutter speed setting ring 13 is rotatably disposed around a mount for the lens barrel 7 on the camera body 1. When the ring 13 is rotated in the up (high speed) or down (low speed) direction, the shutter speed-up switch $SW_{13}$ or the shutter speed-down switch $SW_{14}$ is turned on. In addition, an aperture setting knob 15 is shiftably disposed on the rear lid of the camera body 1. When the knob 15 is shifted to the up (stopping down) or down (opening) direction, the aperture up switch $SW_{15}$ or the aperture down switch $SW_{16}$ is turned on. A power source operating member 17 corresponds to the power switch $SW_{17}$. A display member 18 comprising LCDs (liquid crystal elements) is disposed on the upper surface of the camera body 1. The display member 18 displays a selected photographing mode, shutter speed and aperture depending upon an output of the display circuit 6. In the upper row of the display member 18, photographing modes, P (programmed), A (aperture-priority), T (shutter speed priority), M (manual) and S (special) indicating a previously selected photographing mode by a photographer, are displayed. In the lower rows of the display member 18, a shutter speed and an aperture are displayed in their numeral values. FIG. 2 indicates that a shutter speed is 1/500 second and an aperture is F 5.6. When these data displays are those that have been written in the memory circuit 3, a display |store| is made at the right end of the lowest row in the display member 18.

Figure 3:
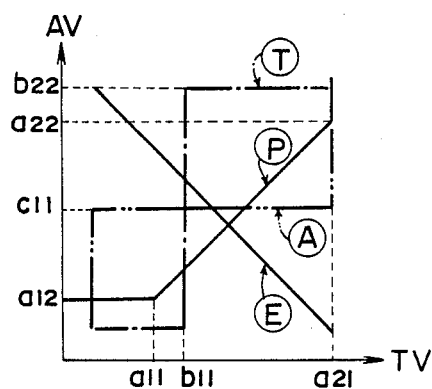
FIG. 3 is a diagram showing examples of AV-TV characteristic lines for photographing modes of the camera shown in FIG. 1.
Figure 4:
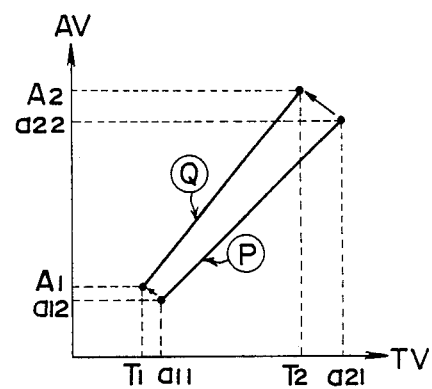
FIG. 4 is a diagram for explaining a shifting operation of the AV-TV characteristic line for the camera shown in FIG. 1.

The multimode camera shown in FIGS. 1 and 2 can select one of various AV-TV characteristic lines in accordance with a photographing mode, as shown in FIG. 3, and can set a new AV-TV characteristic line by freely shifting the selected AV-TV characteristic line, as shown in FIG. 4.

Detailed functions and operations of the multimode camera will be described with reference to the flow chart shown in FIG. 5.

Figure 5:
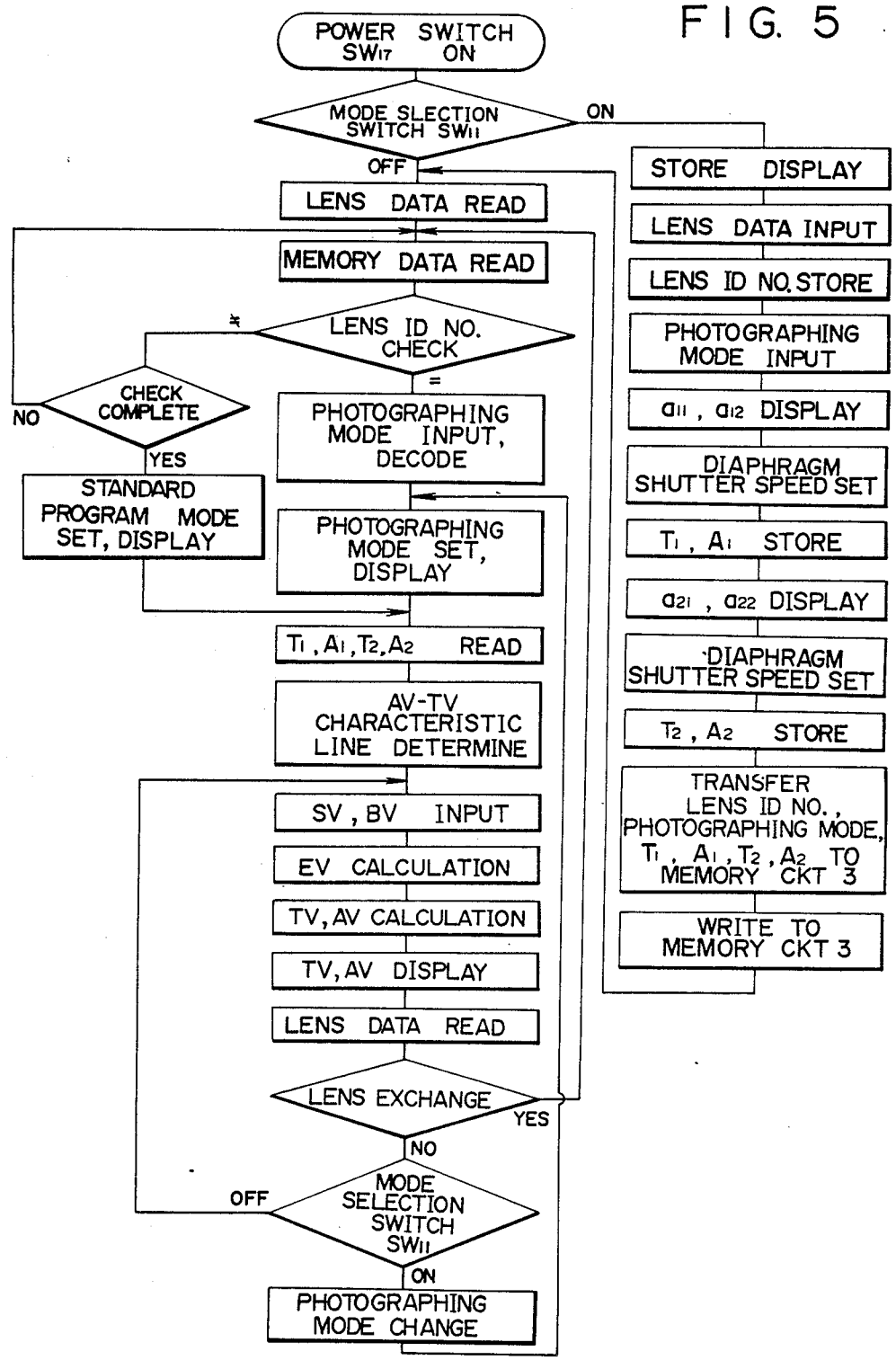
FIG. 5 is a flow chart showing operations of a CPU shown in FIG. 1.

FIG. 5 shows operations of the CPU 2 within the camera in the flow chart. First, normal photographing operations will be described. When the lens barrel 7 is mounted on the camera body 1 and the power source operating member 17 is turned on as shown in FIG. 2, the power switch $SW_{17}$ is turned on and the CPU 2 is enabled. In a normal photographing mode, since the mode button 11 is not depressed before the operating member 17 is turned on, it is decided that the mode selecting switch $SW_{11}$ is off. With this decision, the display |store| is not made on the display member 18. Subsequently, in order to read lens data of the memory in lens circuit 8 in the lens barrel 7 mounted on the camera body 1, the terminal $s_2$ of the CPU 2 is made a low level (hereinafter referred to as "L") so as to select the memory in lens circuit 8. Thereafter, a clock signal is sent to the terminal $c_2$ to input serial data which are delivered in synchronism with the clock signal into the CPU 2 through the terminal $d_2$. The lens data within the memory in lens circuit 8 are lens information peculiar to each lens barrel 7 and required to take a picture, as shown in Table 1. A lens identification number $D_0$, fully open F value $D_1$, minimum aperture $D_2$, focal length $D_3$ and the like are stored by address.

TABLE 1

| Address | Information in Memory in Lens Circuit 8 |
| --- | --- |
| 0 | $D_0$ (Lens ID number) |
| 1 | $D_1$ (Fully open F value) |
| 2 | $D_2$ (Minimum aperture) |
| 3 | $D_3$ (Focal length) |
| 4 | $D_4$ ( . . . ) |
| . | . |
| . | . |
| . | . |
| n | $D_n$ ( . . . ) |

The CPU 2 stores the lens data inputted through the terminal $d_2$ in their memory areas.

Subsequently, the terminal R/W is made a high level (hereinafter referred to as "H"). A clock signal is sent to the terminal $c_1$ so that the CPU 2 serially reads the data stored in the memory circuit 3 which are delivered in synchronism with the clock signal through the terminal $d_1$. Data shown in Table 2 are included in the memory circuit.

TABLE 2

| Lens ID number | Photographing Mode ("0", "1", "2" and "3") | $T_1$ | $A_1$ | $T_2$ | $A_2$ |
| --- | --- | --- | --- | --- | --- |
| 10 | 0 | $a_{11}$ | $a_{12}$ | $a_{21}$ | $a_{22}$ |
| 23 | 1 | $b_{11}$ | 0 | 0 | $b_{22}$ |
| 0 | 0 | 0 | 0 | 0 | 0 |
| . | . | . | . | . | . |
| . | . | . | . | . | . |

Checking a lens identification number $D_0$ (Table 1) stored in the address "zero" among the lens data previously read with all the lens identification numbers in Table 2 stored in the memory circuit 3, the CPU 2 determines whether the same number is included. When the same lens identification number as the lens identification number $D_0$ is found in the memory circuit 3, the CPU 2 detects the lens identification number, and reads and decodes the following photographing mode data shown in Table 2 corresponding to the lens identification number. Photographing mode data in Table 2: "0", "1", "2" and "3" correspond to a programmed AE mode, shutter speed-priority AE mode, aperture-priority AE mode and manual mode, respectively. Thus, the CPU 2 delivers a signal to the display circuit 6 in response to the photographing mode determined by the lens identification number to display it by the display member 18. At this time, the letter "S" which indicates the presence of a preset photographing mode by a photographer is displayed together with the preset one of photographing modes "P", "A", "T" and "M", as described later.

Thereafter, data $T_1$, $A_1$, $T_2$ and $A_2$ which correspond to the photographing mode of the same lens identification number as the lens identification number $D_0$ in the memory circuit 3 are read by the CPU 2 to determine an AV-TV characteristic line from these data.

By way of example, assuming that the lens barrel 7 mounted on the camera body 1 has a value "10" as its lens identification number $D_0$, as can be seen from Table 2, the CPU 2 decodes the data "0" of the photographing mode to display a programmed AE mode "P" together with the display of "S". Also, the CPU 2 reads data of a minimum shutter speed $T_1=a_{11}$, fully open aperture $A_1=a_{12}$, highest shutter speed $T_2=a_{21}$ and minimum aperture $A_{22}=a_{22}$ to select an AV-TV characteristic line ⓟ shown in FIG. 3 with a solid line. When the lens barrel 7 has a value "23" as its lens identification number $D_0$, the data "1" of a photographing mode is decoded and a shutter speed-priority AE mode "T" together with the display of "S" is displayed on the display member 18. Subsequently, the CPU 2 reads data of a present shutter speed $T_1=b_{11}$ and a minimum apertuer $A_2=b_{22}$ to select an AV-TV characteristic line ⓣ shown in FIG. 3 with a dot-dash line. When data are not stored on the lines $A_1$ and $A_2$ in the shutter speed-priority AE mode, values of $A_1$ and $A_2$ correspond to data of a fully open F value $D_1$ and a minimum aperture $D_2$ of the lens, respectively.

Furthermore although not shown in Table 2, when a lens identification number $D_0$ of an aperture-priority AE mode is selected, a letter "A" is displayed together with the display of "S". Then, the CPU 2 reads data of a present aperture $c_{11}$ to select an AV-TV characteristic line ⓐ shown in FIG. 3 with a double dot-dash line.

After an AV-TV characteristic line is selected, the CPU 2 reads film sensitivity information SV, object brightness information BV and the like from the exposure data input circuit 4 (FIG. 1) to calculate an exposure value EV. A proper shutter speed TV and an aperture AV are calculated from the intersection of a straight line Ⓔ of the calculated exposure value EV and an AV-TV characteristic line of each photographing mode and are displayed on the display member 18. In a manual mode, a combination of preset shutter speed and aperture is displayed. However, as is well known, it will be understood that a difference ΔEV between the calculated EV value and the combination of preset shutter speed and aperture may be displayed separately.

As described above, a photographing mode and an AV-TV characteristic line corresponding to a lens identification number $D_0$ of the lens barrel 7 can be selected only by mounting the lens barrel 7 on the camera body 1 and a shutter speed TV and aperture AV suitable for the characteristic line can be displayed on the display member 18. It will be understood that in the case of a shutter speed-priority AE mode, a shutter speed voluntarily preset by a photographer is displayed and in the case of an aperture-priority AE mode, a preset aperture is displayed.

As a result of the comparison between a lens identification number $D_0$ of the mounted lens barrel 7 and the ones in the memory circuit 3, when the corresponding identification number is not found in the memory circuit 3, a photographing mode which is determined as the subsequent priority order, for example, a standard programmed AE mode, is set and displayed. At this time, the letter "S" is not displayed and only the display of "P" is made as a photographing mode. Thereafter, the CPU 2 reads the standard programmed AE mode data, $T_1$, $A_1$, $T_2$ and $A_2$ to determine an AV-TV characteristic line Ⓟ. A proper shutter speed and a proper aperture are calculated from the intersection of the characteristic line Ⓟ and a straight line Ⓔ of the exposure value EV and are displayed in a manner similar to the foregoing.

After the shutter speed TV and aperture value AV are displayed, the CPU 2 again reads data in the memory in lens circuit 8 to determine whether a lens exchange is made. If so, the operation returns again to a flow of reading data in the memory circuit 3. Then, the comparison of lens identification numbers in the memory circuit 3 with the newly read lens data is made. Thus, a photographing mode and an AV-TV characteristic line corresponding to the lens barrel 7 newly mounted on the camera body 1 are selected and the photographing mode, a proper shutter speed and a proper aperture are displayed.

According to circumstances, there is an instance where a photographing in accordance with a photographing mode and an AV-TV characteristic line which are determined by a lens identification number of a mounted lens barrel is not desirous. In such a case, a photographing mode can be changed by depressing the MODE button 11 irrespective of an identification number $D_0$ of the lens barrel 7. Specifically, every depression of the MODE button 11 causes a cyclic selection of photographing modes in the order, for example, of programmed AE mode (P), shutter speed-priority AE mode (T), aperture-priority AE mode (A) and manual mode (M). Thereafter, the operation returns to a flow of setting and displaying a photographing mode. A voluntarily selected photographing mode is displayed by operating the MODE button 11. An AV-TV characteristic line corresponding to the selected photographing mode is determined and a shutter speed TV and an aperture AV are displayed. In this case also, since the photographing mode is not preset by a photographer, the mode display is limited to only one of "P", "A", "T" and "M" and the letter "S" is not displayed.

When a lens is not exchanged and the MODE button 11 is not depressed, a photographing mode and an AV-TV characteristic line which are determined by a lens barrel do not vary and a shutter speed TV and an aperture AV vary in accordance with a film sensitivity SV and object brightness BV.

After a photographing mode, shutter speed and aperture are displayed, the release switch $SW_{10}$ is turned on by depressing the release button 10 and a picture is taken with the photographing mode, shutter speed and aperture displayed on the display member 18.

Next, the data reading operation for setting a photographing mode and an AV-TV characteristic line for each lens barrel will be described with reference to a flow chart shown in FIG. 5. The power source operating member 17 is turned on while depressing the MODE button 11. Then, it is judged that the mode selecting switch $SW_{11}$ is on the routine for reading lens data is selected. Thus, when the routine is initiated, the display of the sign |store| is made on the display member 18. In the routine, the CPU 2 reads lens data shown in Table 1 from the memory in lens circuit 8 of the lens barrel 7 mounted on the camera body 1 in the same manner as in the normal photographing operation and stores a lens identification number $D_0$ stored in the zero address in the memory in lens circuit 8, in its memory area. Thereafter, the CPU 2 awaits until the MODE button 11 is depressed. When the MODE button 11 is not depressed, a programmed AE mode (P) is selected as a photographing mode and is displayed on the display member 18. Photographing modes vary cyclically every depression of the MODE button 11 in such a manner that one depression of the MODE button 11 brings a shutter speed-priority AE mode (T), two depressions bring an aperture-priority AE mode (A) and three depressions bring a manual mode (M) and the photographing mode displays on the display member 18 also vary simultaneously. When the MEMO button 12 is depressed after a desired photographing mode has been selected, the photographing mode is stored in a memory area of the CPU 2.

At this time, the CPU 2 displays a shutter speed and an aperture at the lower limit ($a_{11}$, $a_{12}$) of the proportional limits in the AV-TV characteristic line Ⓟ of a standard programmed AE mode on the display member 18. Accordingly, when an AV-TV characteristic line different from the characteristic line Ⓟ is set, the lower limit ($a_{11}$, $a_{12}$) is shifted to a proper position. The shift is effected such that a desired shutter speed is set by turning the shutter speed setting ring 13 in the up or down direction and a desired aperture is set by turning the aperture setting knob 15 in the up or down direction. Under the present circumstance, when the MEMO button 12 is depressed, the data corresponding to the displayed shutter speed and aperture are stored in memory areas of the CPU 2 as $T_1$ and $A_1$, respectively. Thereafter, a shutter speed and an aperture at the upper limit ($a_{21}$, $a_{22}$) of proportional limits in the AV-TV characteristic line Ⓟ are displayed on the display member 18. Accordingly, when the point ($a_{21}$, $a_{22}$) also is shifted, a desired shutter speed and aperture are similarly set by operating the shutter speed setting ring 13 and the aperture setting knob 15 to desired positions, respectively. Then, when the MEMO button 12 is depressed, the data of the displayed shutter speed and aperture are stored in memory areas of the CPU 2 as $T_2$ and $A_2$, respectively. The values $T_1$, $A_1$, $T_2$ and $A_2$ defines an AV-TV characteristic line Ⓠ, as shown in FIG. 4. Thus, it is possible to set the characteristic line Ⓠ having an arbitrary characteristic in an arbitrary mode on the basis of the AV-TV characteristic line Ⓟ in the standard programmed mode by the shifting operation. The values of lens identification number, photographing mode data and $T_1$, $A_1$, $T_2$ and $A_2$ thus stored in memory areas of the CPU 2 are forwarded through the terminal $d_1$ to the memory circuit 3 while clock signals are transmitted through the terminal $c_1$ at the time the terminal R/W is at the "L" level. Upon forwarding these data to the memory circuit 3, the CPU 2 effects non-volatile writing in the memory circuit 3 by placing the terminal ST from the "H" level of the "L" level.

As described above, a photographing mode and an AV-TV characteristic line selected by a photographer are stored in the memory circuit 3 in correspondence with a lens identification number peculiar to the lens barrel 7 mounted on the camera body 1. Since the memory circuit 3 comprises non-volatile memory elements, data stored therein such as photographing mode will not be erased even when the power switch $SW_{17}$ turns off or the power cell 9 is removed from the camera body 1 after data is stored in the memory circuit 3. Accordingly, after data is stored in the memory circuit 3, it is possible to move to the above flow operations leaving the above stated conditions intact or only by turning the power switch $SW_{17}$ on again after once having turned it off. Specifically, the operation of reading out the photographing mode which as been set as described above in correspondence with a lens identification number peculiar to the mounted lens barrel 7 is selected.

It is to be understood that it is possible to rewrite or erase data once stored by repeating the above described operation.

Figure 6:
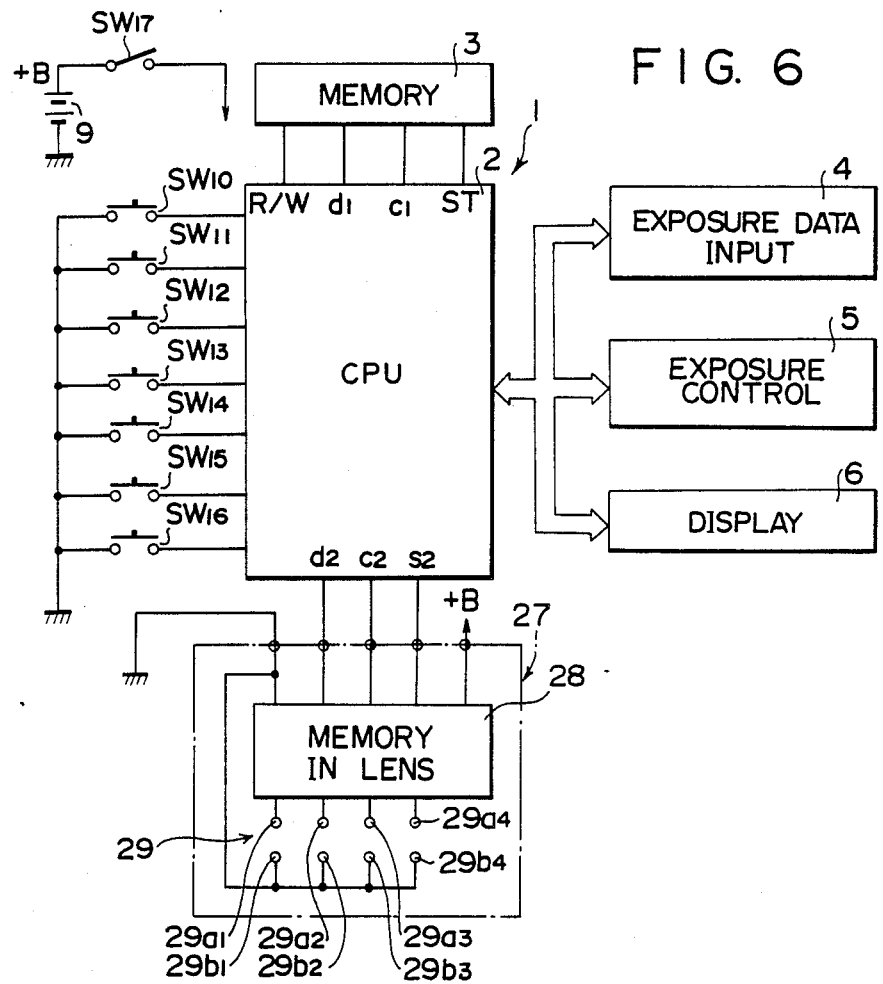
FIG. 6 is a block diagram of an electric circuit for another embodiment of a multimode camera according to the present invention.
Figure 7:
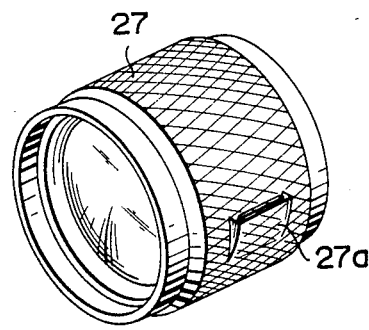
FIG. 7 is a perspective view of a lens barrel for use in the camera shown in FIG. 6.
Figure 8:
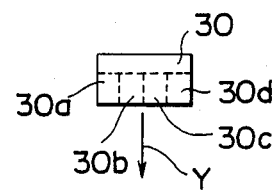
FIG. 8 is a front view of a card for identification numbers to be combined with the lens barrel shown in FIG. 7.

FIG. 6 shows a second embodiment of the present invention. A multimode camera shown in FIG. 6 employs a lens barrel 27 having a card inserting slit 27a at a portion of its outer periphery as shown in FIG. 7. A group of conductive terminals 29 for reading a lens identification number of the four bit system are disposed within the slit 27a. One set of terminals $29a_1$ to $29a_4$ in the terminal group are connected to a memory in lens circuit 28 and the other set of terminals $29b_1$ to $29b_4$ are grounded. An identification number card 30 having a conductive pattern of four bit system corresponding to the terminal group 29, as shown in FIG. 8, is insertable into the slit 27a in the direction shown with an arrow Y. Specifically, the card 30 has four areas 30a to 30d which are to be in opposing relationship with the terminal group 29 of the four bit system and which are selectively provided with a conductive pattern. Accordingly, when the card 30 is inserted into the slit 27a, one terminal out of the terminal group 29 which opposingly abuts against the conductive pattern of the card 30 is short-circuited to the other terminal to allow the memory in lens circuit 28 to read a four-bit signal. The four-bit signal corresponds to the lens identification number as described in the first embodiment. A lens identification number is thus determined in accordance with a configuration of the conductive pattern of the card 30. In other words, in the second embodiment an identification number which is formed by the conductive pattern of the card 30 is read through the memory in lens circuit 28 into the CPU 2 when the lens barrel 27 with the card 30 inserted in the slit 27a is mounted on the camera body 1 and is compared with identification numbers stored in the memory circuit 3. Thus, a photographing mode and an AV-TV characteristic line which are stored in the memory circuit 3 by the same lens identification number therein are selectively read out. Accordingly, it is possible to simply change a plurality of AV-TV characteristic lines to one photographing mode with one lens barrel 27 mounted on the camera body 1 by preparing a plurality of cards 30 different in their identification numbers and by properly changing these cards. In addition, it is possible to simultaneously change photographing modes.

What is claimed is:

1. A camera system, including a camera for use with any one of a plurality of interchangeable lenses, comprising:
   (a) variable setting means for variably setting a value associated with the taking of a picture;
   (b) signal output means for outputting a memory signal in order to store said variable set value in a memory area;
   (c) input means for inputting a different identification number assigned to each interchangeable lens;
   (d) memory means for storing said identification number inputted by said input means and said value set by said setting means in association with each other;
   (e) selection means for inputting an identification number responsive to the interchangeable lens mounted upon the camera; and
   (f) means for reading out from said memory means the variable set value associated with the identification number inputted by said selection means.

2. A method for controlling the photographing operation of a camera capable of having any one of a plurality of camera accessories releasably mounted thereon and including memory means for storing data employed in the control of a photographing operation and an identification number associated with said data; means for calculating the values required for performing a photographing operation and means for controlling the camera according to the calculated values, said method comprising the steps of:
   (a) assigning an identification number to each camera accessory;
   (b) setting a value employed in the calculation of a photographing operation into the memory means, said value being associated with a particular camera accessory;
   (c) associating said value with the identification number for the camera accessory;
   (d) detecting the identification number of the camera accessory mounted upon the camera body;
   (e) selecting the said value stored in memory associated with the identification number detected; and
   (f) providing the set value selected from memory to the calculation means.

3. The method of the claim 2 further comprising the steps of storing standard program values in said memory; and
   selecting said standard program values from said memory when the identification number of the camera accessory mounted upon the camera fails to compare with any of the identification numbers in said memory.

4. A camera system, including a camera for use with anyone of a plurality of interchangeable camera accessories, comprising:

variable setting means for variably setting a value associated with a taking of a picture;

signal output means for outputting a memory signal in order to store said variable set value in a memory area;

input means for inputting a different identification number assigned to each camera accessory;

memory means responsive to the camera accessory mounted upon the camera for storing the identification number inputted by said input means and said value set by said setting means in association with each other;

a coded member for storing an identification number;

each of said camera accessories including means for releasably receiving one of said coded cards for altering the identification number of the camera accessory according to the coded card mounted in said receiving means;

means responsive to the coded card contained within the camera accessory mounted upon the camera for selecting the data in the camera memory associated with the identification number presently contained within the camera lens.

5. An automatic exposure setting camera capable of releasably mounting a selected one of a plurality of camera accessories thereto comprising:

memory means in said camera for storing a plurality of different groups of data, each group of data defining an AV-TV line, each of said groups of data associated with a different identification number;

a plurality of coded cards, each of said coded cards containing one of said identification numbers;

said camera accessory including means for releasably receiving selected ones of said coded cards;

means responsive to the coded card contained within said camera accessory mounted upon the camera for selecting that group of data in the camera memory whose associated identification number corresponds with the identification number of the coded card contained within the camera accessory mounted upon the camera.

6. A method for controlling the photographing operation of a camera capable of having any one of a plurality of camera accessories releasably mounted thereon and including memory means for storing data employed in the control of a photographing operation and an identification number associated with said data; means for calculating the values required for performing a photographing operation and means for controlling the camera according to the calculated values, and a plurality of coded cards each containing a different identification number, said camera accessory including means for releasably receiving one of said coded cards, said method comprising the steps of:

inserting one of said coded cards into one of said camera accessories;

mounting said one of said camera accessories upon said camera;

comparing the identification number of the coded card contained in the camera accessory mounted upon said camera with the identification numbers in the camera memory upon mounting of the camera accessory upon the camera;

selecting the data associated with the identification number in the camera memory which corresponds to the identification number in the coded card contained within the camera accessory mounted upon the camera; and providing the data from the camera memory to the calculation means.

7. The method of claim 6 further comprising the step of selecting a predetermined group of data from the camera memory when none of the identification codes stored in memory compare with the identification code of the coded card contained in the camera accessory mounted upon the camera.

* * * * *

UNITED STATES PATENT AND TRADEMARK OFFICE
CERTIFICATE OF CORRECTION

PATENT NO. : 4,931,823

DATED : June 5, 1990

INVENTOR(S) : Nakajima et al.

It is certified that error appears in the above-identified patent and that said Letters Patent is hereby corrected as shown below:

Column 4, line 47, "$A_{22} = a_{22}$" should be --$A_2 = a_{22}$--

Column 4, line 54, "present" should be --preset--

Column 4, line 55, "apertuer" should be --aperture--

Column 4, line 65, "present" should be --preset--

Column 7, line 35, "as" (first occurrence) should be --has--

Signed and Sealed this

Seventeenth Day of September, 1991

Attest:

HARRY F. MANBECK, JR.

Attesting Officer

Commissioner of Patents and Trademarks